United States Patent [19]
Ulbrich

[11] Patent Number: 6,129,498
[45] Date of Patent: Oct. 10, 2000

[54] METHOD FOR UNLOADING OPEN CONTAINERS OF COMPACTED OR LOOSELY COMPACTED TOBACCO BALES

[75] Inventor: Hans Joachim Paul Alexander Ulbrich, Visnadello, Italy

[73] Assignee: Garbuio S.p.A., Paese, Italy

[21] Appl. No.: 09/186,203

[22] Filed: Nov. 4, 1998

[51] Int. Cl.⁷ .................................................. B65G 65/23
[52] U.S. Cl. ......................... 414/420; 414/421; 414/422; 414/810
[58] Field of Search .................... 414/421, 420, 414/422, 419, 425, 810

[56] References Cited

U.S. PATENT DOCUMENTS

| | | | |
|---|---|---|---|
| 2,727,641 | 12/1955 | Tomkins | 414/421 |
| 2,980,272 | 4/1961 | Wedensky | 414/421 |
| 3,883,017 | 5/1975 | Shirai et al. | 414/421 |
| 4,295,776 | 10/1981 | Payne et al. | 414/421 |
| 4,303,366 | 12/1981 | Hinchcliffe et al. | 414/419 |
| 4,370,087 | 1/1983 | Shepard . | |
| 4,744,715 | 5/1988 | Kawabata | 414/419 |
| 5,288,200 | 2/1994 | Burgers et al. | 414/422 |
| 5,435,688 | 7/1995 | Tokunaga et al. | 414/419 |

FOREIGN PATENT DOCUMENTS

| | | |
|---|---|---|
| 409021 | 5/1998 | Russian Federation . |
| 2 152 911 | 8/1985 | United Kingdom . |
| 2 234 485 | 2/1991 | United Kingdom . |
| 2 254 595 | 10/1992 | United Kingdom . |
| 2 256 635 | 12/1992 | United Kingdom . |

Primary Examiner—Steven A. Bratlie
Attorney, Agent, or Firm—Daniel O'Byrne

[57] ABSTRACT

A method for unloading open containers for uncompacted or loosely compacted tobacco bales, comprising the steps of engaging an open container full of tobacco, closing the container, first tipping the container, partially opening the container onto an underlying loading platform and consequently partially unloading the tobacco. The container is then lifted, consequently fully unloading the tobacco, and then a second tipping and release steps of the empty container follow in order to resume the cycle from the start.

9 Claims, 7 Drawing Sheets

METHOD FOR UNLOADING OPEN CONTAINERS OF COMPACTED OR LOOSELY COMPACTED TOBACCO BALES

BACKGROUND OF THE INVENTION

The present invention relates to a method for unloading open containers of uncompacted or loosely compacted tobacco bales.

Currently it is usual to place tobacco, in its various forms (and therefore in strips, cut stems, expanded, uncompacted or loosely compacted, etcetera) into suitable and appropriately prepared containers which are substantially shaped like a parallelepiped.

These containers, which have standard shapes in order to allow uniform transport, storage and processing of the tobacco, can be constituted by a box-like cardboard structure of suitable thickness having an openable upper end.

These cartons can then be reused after they have been emptied of their content.

As an alternative, the containers are made of wood or metal with suitable side walls and a suitable bottom and with a generally open upper side.

Said containers are sometimes provided with wheels which are applied to their bottom for better handling and with lateral profiles to make it easier for handling units to engage them.

The production cycle of tobacco manufacturing and processing companies requires at several stages operations for tipping and emptying the containers.

Machines are known for this purpose which are constituted by an engagement device, such as a substantially L-shaped rigid arm, on a wing of which the lower base or the bottom of the container, which is open, is rested and engaged. The other wing of the arm is pivoted, at one end, to a pivot so as to allow to tip said container, for example to unload the tobacco onto a suitable conveyor belt which is arranged to the rear and above said arm.

It is also known to provide arms which are fixed, at the tipping axis, to lifting devices which are suitable to produce a lifting movement before the above-mentioned tipping movement, again using an open container.

This method used to unload conventional containers entails considerable drawbacks. First of all, the uncompacted or loosely compacted tobacco is unloaded from the container at a certain height above a platform or conveyor belt, as in the described case; the impact entails a deterioration of said tobacco, which is shredded further, also forming dust.

The resulting piece size reduces the quality of the subsequent processes, since such processes occur in a less than optimum manner because they are usually preset for a given piece size or shape of said tobacco.

Moreover, dust is released into the surrounding environment when the tobacco falls from the container, requiring the use of localized suction systems which are not always able to aspirate the dust completely.

SUMMARY OF THE INVENTION

The aim of the present invention is to solve the above-mentioned problems, eliminating the drawbacks of the cited prior art, by providing a method which allows to unload the tobacco from suitable containers for uncompacted or loosely compacted tobacco bales, maintaining the piece size of the tobacco and protecting it against any deterioration.

Within the scope of this aim, an important object of the present invention is to provide a method which allows to unload uncompacted or loosely compacted tobacco from containers without producing dust.

Another object of the invention is to provide a method which is reliable and safe and can be performed with conventional machines and equipment.

This aim, these objects and others which will become apparent hereinafter are achieved by a method for unloading open containers for uncompacted or loosely compacted tobacco bales, characterized in that it comprises the steps of:

engaging an open container full of tobacco;

closing said container;

performing a first tipping of said closed container;

partially opening said container onto an underlying loading platform and consequently partially unloading the tobacco contained in said container;

lifting said container and consequently fully unloading said tobacco; and performing a second tipping and releasing the empty container.

The above aim and objects and others are also achieved by a device for unloading open containers for uncompacted or loosely compacted tobacco bales, comprising an L-shaped arm for engaging an open containers, said arm being pivoted transversely to a first wing and being movable vertically with respect to a loading platform, characterized in that a cover for temporarily closing/opening said container is rotatably associated with a second wing.

BRIEF DESCRIPTION OF THE DRAWINGS

Further characteristics and advantages of the present invention will become apparent from the following detailed description of a particular but not exclusive embodiment thereof, illustrated only by way of non-limitative example in the accompanying drawings, wherein

FIG. 1 is a perspective view of the step for the engagement of the container, for which a side wall and the contents have been omitted;

FIG. 2 is a view, similar to FIG. 1, of the end of the engagement step, illustrating the presence of tobacco inside the container but omitting one of the lateral surfaces;

FIG. 3 is a view, similar to FIG. 2, of the arrangement of the container after a first rotation;

FIG. 4 is a view, similar to FIG. 3, of a position of the container as it returns to the condition shown in FIG. 1, a lateral surface of the container and the tobacco contained therein being omitted;

FIG. 5 is a view, similar to the preceding figures, of the arrangement of the container after the second rotation and after the cover has started to open to allow the unloading of the tobacco;

FIG. 6 is a view, similar to the preceding figures, of the tobacco unloaded from the container;

FIG. 7 is a view, similar to FIG. 6, of the step after the unloading of the tobacco, with a side wall of the container omitted for the sake of clarity.

DESCRIPTION OF THE PREFERRED EMBODIMENTS

Figure 1:
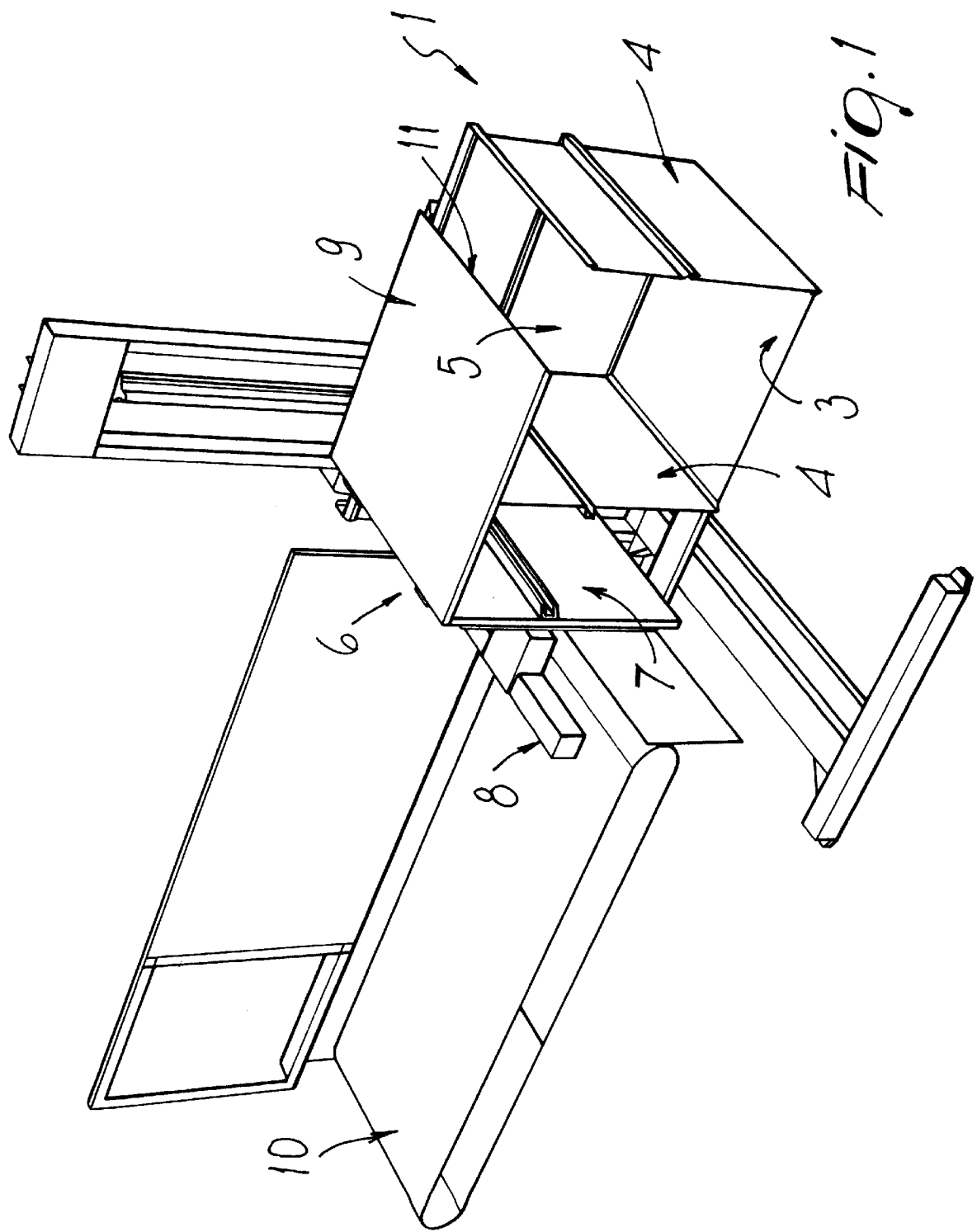
FIGS. 1–7 illustrate operating steps of the method according to the invention, and in particular.
Figure 2:
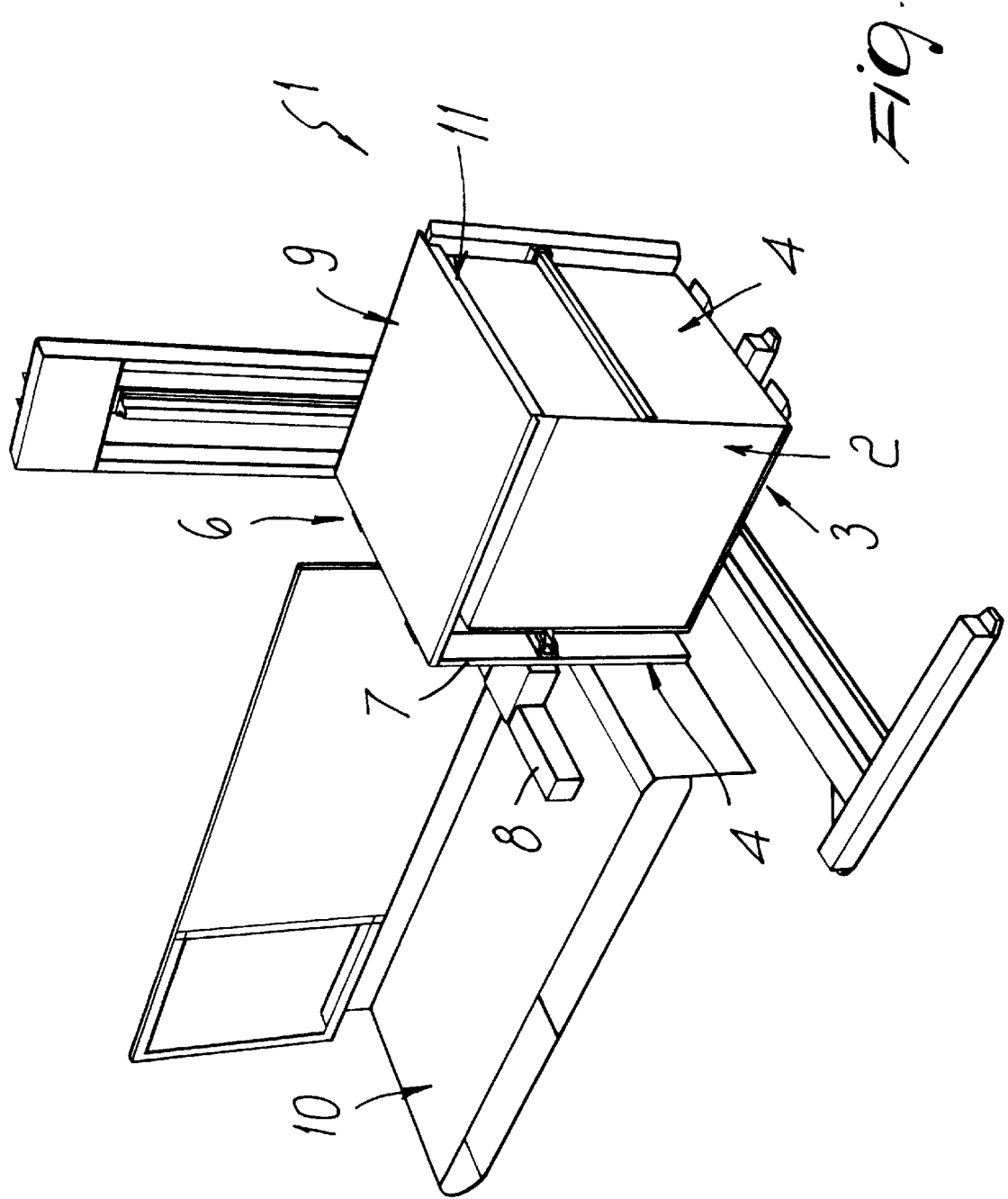
Figure 3:
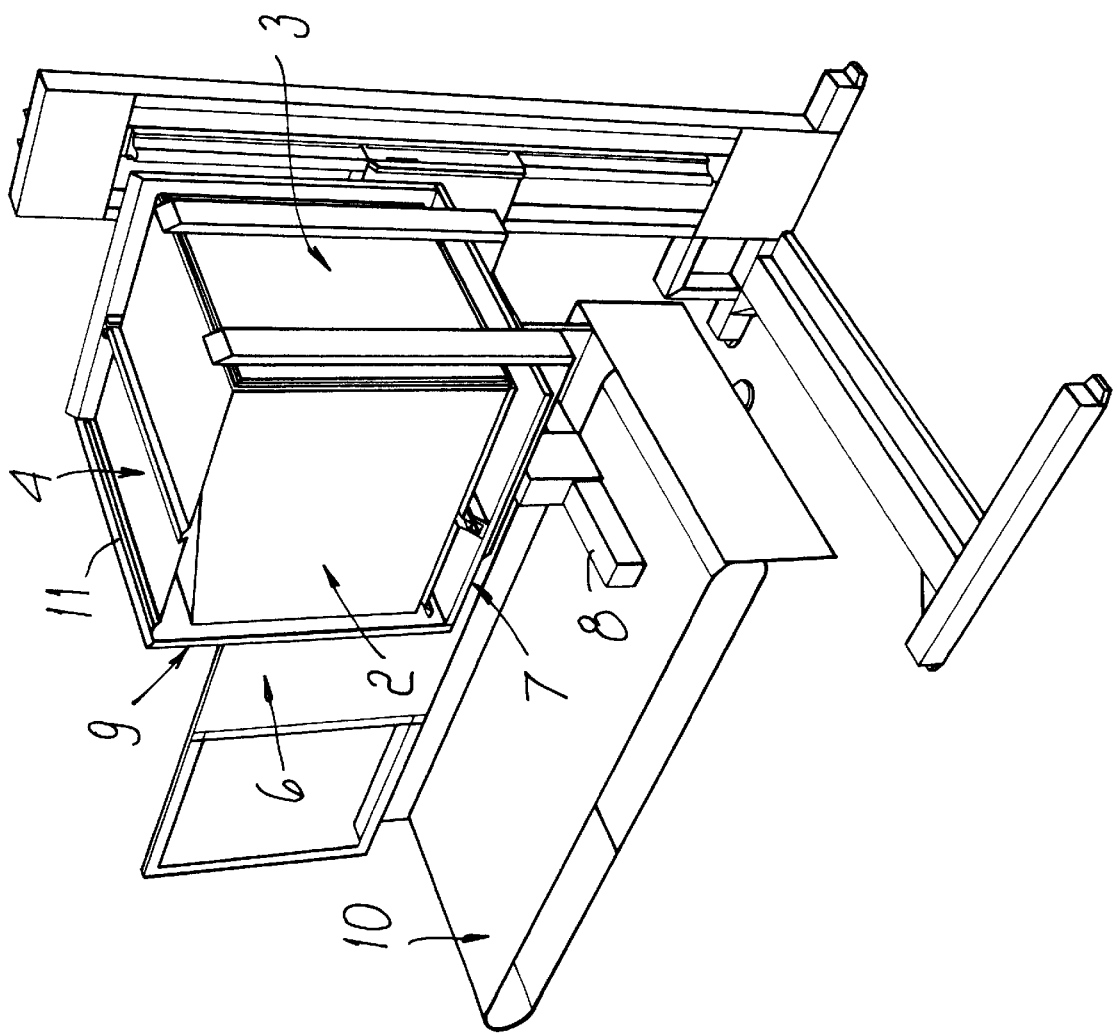
Figure 4:
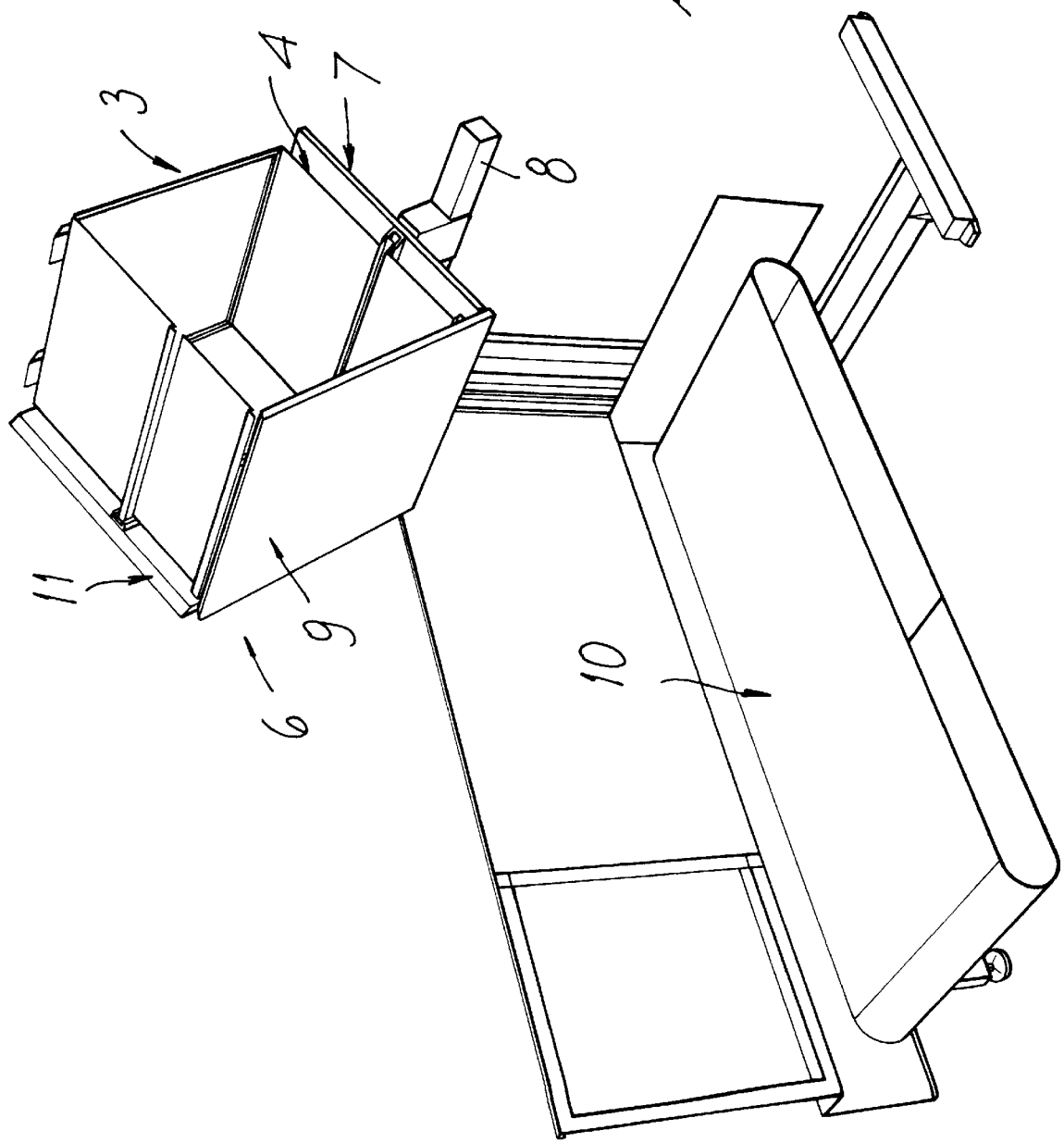

With reference to the above figures, the reference numeral 1 designates a container for tobacco, designated by the reference numeral 2 (see FIG. 2), which is uncompacted or loosely compacted in bales and is therefore constituted for example by shredded tobacco or tobacco stems.

The container 1 has a box-like shape which, in the particular embodiment selected, is preferably but not necessarily cubic.

The container 1 is constituted by a bottom 3 and by side walls 4 and has an upper opening 5.

According to the method, the container 1, which is full of tobacco 2 and open, is engaged by a substantially L-shaped arm 6 having a first wing 7 which engages a side or lower wall 4 of the container L.

The first wing 7 is transversely pivoted by being fixed to a pivot 8, which is conveniently motorized in order to achieve a rotation of the container 1 and lift and/or lower it.

The arm 6 also has a second wing 9 having dimensions such as to cause the wing to be superimposed on the container 1 at the opening 5 so as to close it.

The second wing 9 is advantageously pivoted at one end of the first wing 7 and its oscillation is actuated by suitable mechanisms and/or actuators.

The method then entails a step in which the full and open container is engaged by the arm 6; this entrails arranging the second wing 9 at the opening 5 and at the container 1 and thus also closes said container.

The method then entails a first tipping through approximate 180° of the container 1 closed in this manner, so as to arrange the second wing 9 above an underlying loading platform 10 for the tobacco 2, such as for example a conveyor belt.

Figure 5:
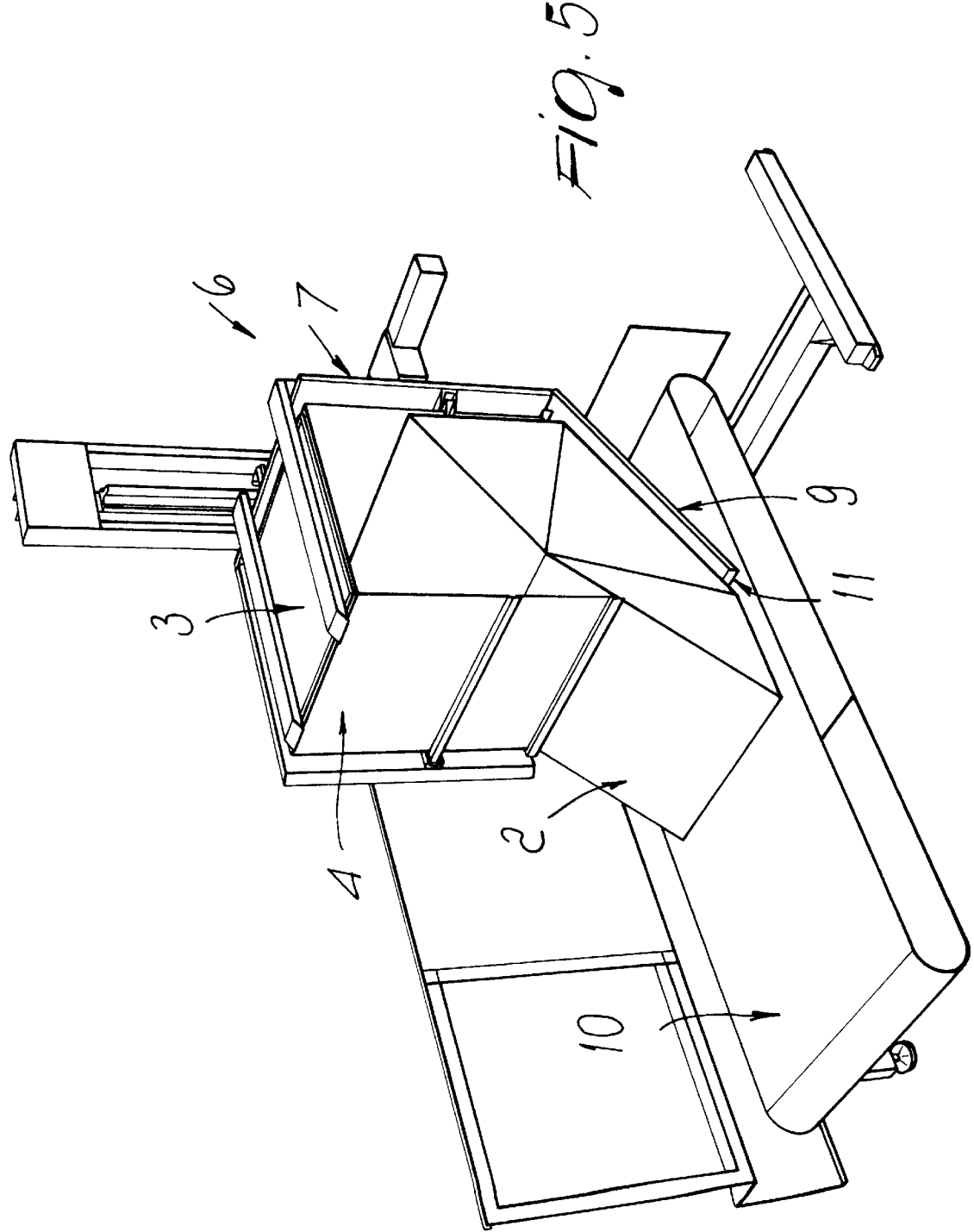
Figure 6:
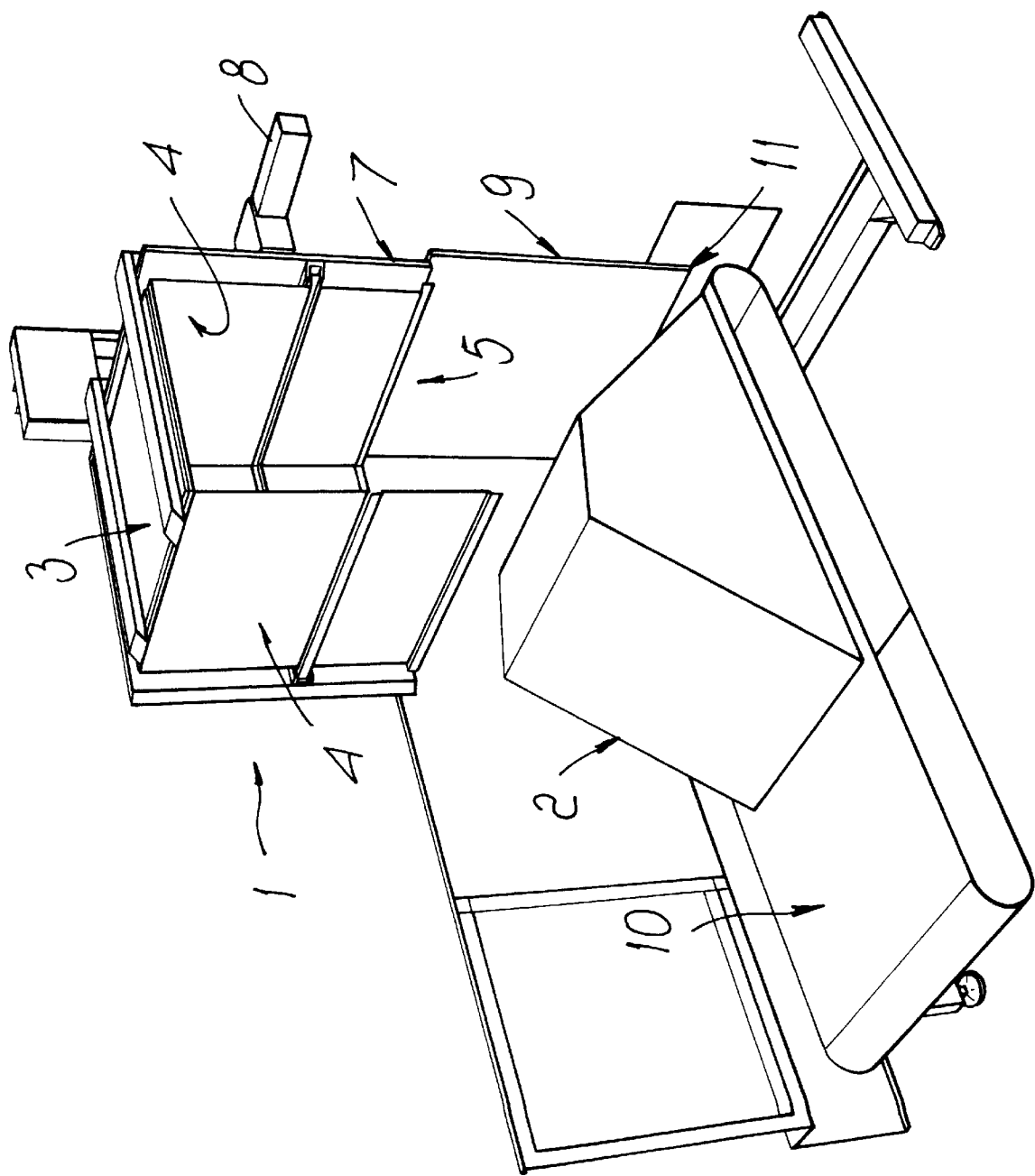
Figure 7:
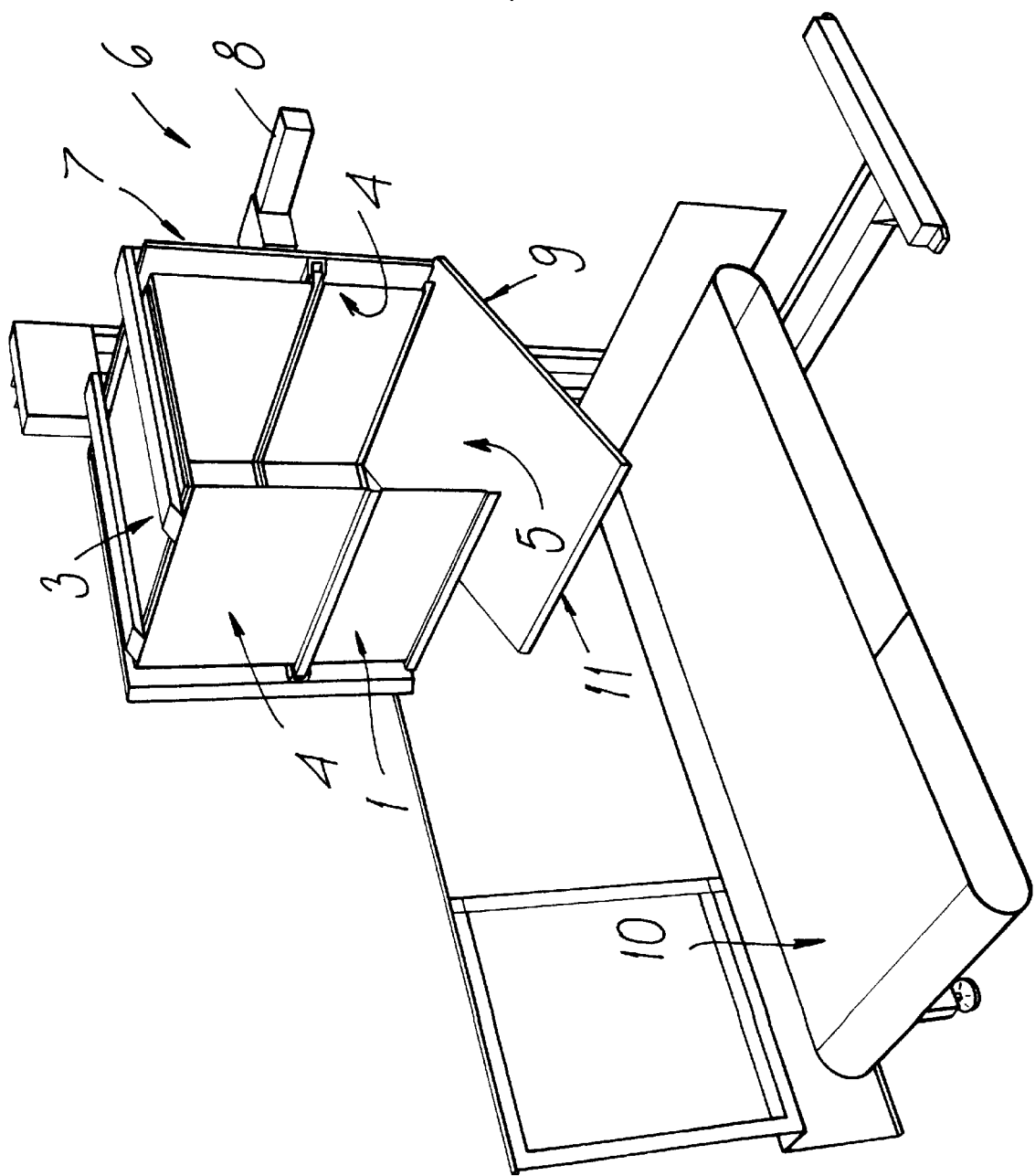

The method then entails the partial opening of the container 1 by means of the partial rotation of the second wing, the free end 11 of which is arranged adjacent to, or in contact with, the loading platform 10: in this manner the tobacco is partially unloaded onto said platform 10, as shown in FIG. 5.

The method then entails the lifting of the container 1 and the rotation of the second wing 9 so as to free the opening 5 and achieve the complete unloading of the tobacco onto the platform 10.

The method then entails the closure of the opening 5 by means of a rotation of the second wing 9 and a second tipping, through approximately 180°, of the container 1 and the subsequent release thereof by the arm 6 to begin the cycle again.

It ha thus been observed that the invention has achieved the intended aim and objects, a method and a device having been provided which allow to unload the uncompacted or loosely compacted tobacco from suitable containers, maintaining the piece size of said tobacco and avoiding the formation of dust.

All this allows to perform subsequent processing of the tobacco in an optimum manner.

The steps of the method may of course also entail different extents for the rotations and a first tipping constituted by a sequence of distinct microrotations suitable to facilitate the unloading of the tobacco by gravity.

The devices required to handle the arm and/or the container and/or the support for the tobacco may of course be the most pertinent according to specific requirements.

The claimed device is of course susceptible of numerous modifications and variations, all of which are within the scope of the same inventive concept.

The materials and the dimensions that constitute the individual components of the claimed device may of course also be the most pertinent according to specific requirements.

What is claimed is:

1. A method for unloading loose tobacco from an open container which comprises a bottom and side walls which form an inside of the container in which said loose tobacco is loaded and which further comprises an open top, comprising the steps of:

engaging said open container full of loose tobacco with an L-shaped arm comprising a first wing and a second wing which are mutually interconnected at an axis such that said first wing and said second wing are mutually pivotally connected to each other about said axis;

closing said container such that said second wing of said L-shaped arm is arranged so as to close said open top of said container full of loose tobacco so that said container is a closed container full of loose tobacco with said bottom of said container arranged downwardly with respect to said container and said second wing of said L-shaped arm being arranged upwardly with respect to said container;

performing a first tipping of said closed container to form a tipped closed container such that said bottom of said container is arranged upwardly with respect to said tipped closed container and said L-shaped arm is arranged downwardly with respect to said tipped closed container above an underling loading platform;

partially opening said tipped closed container by pivoting said second wing of said L-shaped arm with respect to said first wing of said L-shaped arm so as to perform a partial extent of opening of said container onto said underlying loading platform and consequently partially unloading said loose tobacco such that said loose tobacco flows onto said loading platform;

lifting said container and simultaneously opening said container a further extent with respect to said partial extent of opening by further pivoting said second wing of said L-shaped arm with respect to said first wing of said L-shaped arm and consequently fully unloading said tobacco such that said loose tobacco flows onto said loading platform to form an empty container; and performing a second tipping of said empty container and releasing the empty container.

2. The method of claim 1, wherein said first tipping comprises tipping said closed container through approximately 180°.

3. The method of claim 1, wherein a second closing of said container is performed before said second tipping, said second tipping comprising a tipping of said container through approximately 180°.

4. A device for unloading loose tobacco from an open container having a bottom and side walls which form an inside of the container in which said loose tobacco is loaded and further having an open top, comprising:

an L-shaped arm for engaging said open container full of loose tobacco, said L-shaped arm comprising a first wing and a second wing which are mutually interconnected at an axis such that said first wing and said second wing are mutually pivotally connected to each other about said axis, said arm being pivoted transversely at a tipping axis of said first wing of said L-shaped arm and being movable vertically with respect to a loading platform;

a cover for temporarily closing/opening said open top of said container which is formed by said second wing of said L-shaped am such that when said L-shaped arm engages said container said second wing of said L-shaped arm is arranged so as to close said open top of said container full of loose tobacco so that said container is a closed container full of loose tobacco with said bottom of said container arranged downwardly with respect to said container and said second wing of said L-shaped arm being arranged upwardly with respect to said container;

means for tipping said closed container about said tipping axis to form a tipped closed container such that said bottom of said container is arranged upwardly with respect to said tipped closed container and said L-shaped arm is arranged downwardly with respect to said tipped closed container above said loading platform; and means for partially opening said tipped closed container by pivoting said second wing of said L-shaped arm with respect to said first wing of said L-shaped arm so as to perform a partial extent of opening of said container for a partially unloading of said loose tobacco onto said loading platform such that said loose tobacco flows onto said loading platform; and means for lifting said container and simultaneously opening said container a further extent with respect to said partial extent of opening by further pivoting said second wing of said L-shaped arm with respect to said first wing of said L-shaped arm for fully unloading said tobaco such that said loose tobacco flows onto said loading platform.

5. The device according to claim 4, wherein said second wing of said L-shaped arm is rotatably connected to one end of said first wing of said L-shaped arm and interacts with means for rotating said second wing of said L-shaped arm.

6. The method of claim 1, comprising loading said loose tobacco on said loading platform constituted by a conveyor belt, ad partially opening said tipped closed container by pivoting said second wing having a free end thereof in contact with said conveyor belt.

7. The method of claim 1, comprising partially opening said tipped closed container by pivoting said second wing having a free end thereof in contact with said loading platform.

8. The device according to claim 4, wherein said loading platform is constituted by a conveyor belt, and said means for tipping said closed container and said means for partially opening said tipped closed container are configured such that said tipped closed container is partially opened by pivoting said second wing having a free end thereof in contact with said conveyor belt.

9. The device according to claim 4, wherein said means for tipping said closed container and said means for partially opening said tipped closed container are configured such that said tipped closed container is partially opened by pivoting said second wing having a free end thereof in contact with said loading platform.

* * * * *

UNITED STATES PATENT OFFICE

CERTIFICATE OF CORRECTION

Patent No. 6,129,498          Dated October 10, 2000

Inventor(s) ULBRICH Hans Joachim Paul Alexander

It is certified that error appears in the above-identified patent and that said Letters Patent are hereby corrected as shown below:

ON THE TITLE PAGE

[54] METHOD FOR UNLOADING OPEN CONTAINERS OF UNCOMPACTED OR LOOSELY COMPACTED TOBACCO BALES

Signed and Sealed this

Eighth Day of May, 2001

*Attest:*

NICHOLAS P. GODICI

*Attesting Officer*      *Acting Director of the United States Patent and Trademark Office*